(12) United States Patent
Tarbox

(10) Patent No.: US 12,008,542 B2
(45) Date of Patent: *Jun. 11, 2024

(54) SYSTEMS AND METHODS FOR PERFORMING PAYMENT TRANSACTIONS USING INDICIA-BASED ASSOCIATIONS BETWEEN USER INTERFACES

(71) Applicant: Worldpay, LLC, Symmes Township, OH (US)

(72) Inventor: David Tarbox, Symmes Township, OH (US)

(73) Assignee: Worldpay, LLC, Symmes Township, OH (US)

( * ) Notice: Subject to any disclaimer, the term of this patent is extended or adjusted under 35 U.S.C. 154(b) by 173 days.

This patent is subject to a terminal disclaimer.

(21) Appl. No.: 17/446,137

(22) Filed: Aug. 26, 2021

(65) Prior Publication Data
US 2021/0390529 A1  Dec. 16, 2021

Related U.S. Application Data

(63) Continuation of application No. 15/381,833, filed on Dec. 16, 2016, now Pat. No. 11,132,670.

(51) Int. Cl.
*G06Q 20/32* (2012.01)
*G06K 7/14* (2006.01)
(Continued)

(52) U.S. Cl.
CPC ....... *G06Q 20/3276* (2013.01); *G06K 7/1447* (2013.01); *G06Q 20/12* (2013.01); *G06Q 20/385* (2013.01); *G06Q 20/40145* (2013.01)

(58) Field of Classification Search
None
See application file for complete search history.

(56) References Cited

U.S. PATENT DOCUMENTS

2011/0251892 A1  10/2011  Laracey
2012/0130889 A1*  5/2012  Lyons ............... G06Q 20/3272
                                                       705/39
(Continued)

OTHER PUBLICATIONS

N PL Lam, G., Bitcoin 101: Bitcoin for Small Business Pt 4—Accepting Bitcoin in Your Business, Feb. 18, 2015, retrieved Jun. 28, 2019 from https://www.accountexnetwork.com/blog/2015/02/accepting-bitcoin/, entire document pertitent. (Year: 2015).

(Continued)

*Primary Examiner* — Gregory S Cunningham, II
(74) *Attorney, Agent, or Firm* — Bookoff McAndrews, PLLC

(57) ABSTRACT

Systems and methods are disclosed for performing payment transactions using indicia-based associations between two or more user interfaces. One method includes: receiving transaction information related to a user's selection of goods or services from a merchant; generating an indicia encoding the transaction information related to the selected goods or services, the merchant, and the transaction amount; transmitting the indicia to be displayed, and to enable a user interface of a first user device to scan the indicia and extract the transaction information; receiving from the first user device, an authorization to process the payment transaction using a mobile payment source; and if sufficient resources exist in the mobile payment source: generating and transmitting a low value token to the merchant indicating the authorization of the payment transaction, wherein the low value token conceals the information related to the mobile payment source; and processing the transaction using the mobile payment source.

20 Claims, 6 Drawing Sheets

(51) Int. Cl.
  *G06Q 20/12* (2012.01)
  *G06Q 20/38* (2012.01)
  *G06Q 20/40* (2012.01)

(56) References Cited

U.S. PATENT DOCUMENTS

| | | | | |
|---|---|---|---|---|
| 2012/0205433 A1* | 8/2012 | Dudek | ................ | G06Q 20/209 235/375 |
| 2013/0048714 A1* | 2/2013 | Sharma | ................ | G06Q 20/346 235/379 |
| 2013/0238455 A1* | 9/2013 | Laracey | ................ | G06Q 20/102 705/21 |
| 2013/0278622 A1* | 10/2013 | Sun | ................ | G06Q 20/325 345/589 |
| 2013/0290187 A1 | 10/2013 | Itwaru | | |
| 2013/0328455 A1* | 12/2013 | Wu | ................ | H02K 11/21 310/68 B |
| 2014/0100973 A1* | 4/2014 | Brown | ................ | G06Q 20/322 705/17 |
| 2014/0101036 A1* | 4/2014 | Phillips | ................ | G06Q 20/3229 705/39 |
| 2014/0108252 A1 | 4/2014 | Itwaru et al. | | |
| 2014/0236767 A1 | 8/2014 | Duggal et al. | | |
| 2015/0161597 A1 | 6/2015 | Subramanian et al. | | |
| 2015/0332226 A1 | 11/2015 | Wu et al. | | |
| 2016/0098712 A1 | 4/2016 | Karaki | | |
| 2017/0236113 A1* | 8/2017 | Chitalia | ................ | H04L 9/3213 705/44 |
| 2017/0344994 A1* | 11/2017 | Wang | ................ | G06Q 20/405 |
| 2018/0253718 A1 | 9/2018 | Khan et al. | | |
| 2019/0026723 A1* | 1/2019 | Narasimhan | ................ | G06Q 30/0267 |

OTHER PUBLICATIONS

Kharraz, et al., Optical Elusions: A Study of Malicious QR Codes in the Wild, 2014 44th Annual IEEE/IFIP International Conference on Dependable Systems and Networks (Year: 2014).

* cited by examiner

SYSTEMS AND METHODS FOR PERFORMING PAYMENT TRANSACTIONS USING INDICIA-BASED ASSOCIATIONS BETWEEN USER INTERFACES

CROSS-REFERENCE TO RELATED APPLICATION(S)

This patent application is a continuation of and claims the benefit of priority to U.S. Nonprovisional patent application Ser. No. 15/381,833, filed on Dec. 16, 2016, the entirety of which is incorporated herein by reference.

FIELD OF DISCLOSURE

The present disclosure relates generally to the field of payment transactions and, more particularly, to methods of performing payment transactions using indicia-based associations between two or more user interfaces.

BACKGROUND

Payment transactions between users and merchants may occur using various means, including cash, credit cards, debit cards, checks, etc. Each type of financial accessory (e.g., cash, credit cards, debit cards, checks, etc.,) may be designated to a particular type of purchase or financial exchange. For example, a consumer may concurrently hold a credit card account that may be designated for gas or automotive purchases, a credit card account specifically for travel-related purchases, a general purpose credit card account for miscellaneous purchases, as well as one or more loyalty credit card accounts for use with specific merchants. In addition, the consumer may also hold, concurrently, one or more debit card accounts associated with respective banking providers. As the number of payment sources held by the consumer increases, however, it may become increasingly inconvenient to carry such a large number of financial accessories (e.g., cash, credit cards, debit cards, checks, etc.) in their wallet on top of their mobile phones.

Partly as a result of the burden of carrying numerous financial accessories, users are increasingly shifting to using handheld portable electronic devices to conduct payment transaction with the various merchants. The handheld portable electronic device may have the accounts of the various payment sources (e.g., cash, credit cards, debit cards, checks, etc.) saved and ready to be used to conduct payment transactions at various payment terminals of merchants. During the initiation of a payment transaction at a payment terminal of a merchant, consumers may transfer details of the payment source to be used for the transaction. The transfer may occur, for example, using a near field communication sensor. However, consumers may be hesitant to have sensitive information related to their payment sources and/or their accounts (e.g., credit card numbers, checking account numbers, etc.) transferred to third parties, including merchants. In addition, a user may desire to be able to conduct payment transactions in the privacy of their computers at their homes, offices, etc., by simply using their handheld portable electronic devices, without having to travel to a merchant payment terminal, and without transferring any sensitive payment source and/or account information to the merchant.

Thus, there is a desire for systems and methods configured to enable payment transactions to be conducted remotely, using only a handheld portable electronic device (e.g., a mobile phone) and a device having an ability to browse a merchant site (e.g., an "external user device"), which is efficient, and prevents the sharing of personal financial information (e.g., account numbers and payment source details) with third parties, including merchants.

SUMMARY

According to certain aspects of the present disclosure, systems and methods are disclosed for performing payment transactions using indicia-based associations between two or more user interfaces.

In one embodiment, a computer-implemented method is disclosed for performing payment transactions using indicia-based associations between two or more user interfaces. The method includes: receiving transaction information related to a user's selection of goods or services from a merchant, including a transaction amount; generating or receiving an indicia encoding the transaction information related to the selected order, merchant, and payment amount; transmitting the indicia to be displayed, on a merchant site hosted by the merchant, the display of the indicia enabling a user interface of a user device to scan the indicia and extract information related to the selected order, merchant, and payment amount; receiving from a user device of a user, an authorization to process the payment transaction, based on the information related to the selected order, merchant, and payment amount, using a mobile payment source of the user; and if sufficient resources exist in the mobile payment source of the user for the payment transaction: generating and transmitting a low value token to the merchant indicating the authorization of the payment transaction using the mobile payment source of the user, wherein the low value token conceals the information related to the mobile payment source; and processing the transaction using the resources of the mobile payment source.

In accordance with another embodiment, a system is disclosed for performing payment transactions using indicia-based associations between two or more user interfaces. The system comprises: a data storage device storing instructions for performing payment transactions using indicia-based associations between two or more user interfaces; a merchant web server that that hosts a merchant site that is displayed on an external user interface; a user device having a user interface different from the external user interface; and a processor configured to execute the instructions to perform a method including: receiving transaction information related to a user's selection of goods or services from a merchant, including a transaction amount; generating or receiving an indicia encoding the transaction information related to the selected order, merchant, and payment amount; transmitting the indicia to be displayed, on a merchant site hosted by the merchant, the display of the indicia enabling a user interface of a user device to scan the indicia and extract information related to the selected order, merchant, and payment amount; receiving from a user device of a user, an authorization to process the payment transaction, based on the information related to the selected order, merchant, and payment amount, using a mobile payment source of the user; and if sufficient resources exist in the mobile payment source of the user for the payment transaction: generating and transmitting a low value token to the merchant indicating the authorization of the payment transaction using the mobile payment source of the user, wherein the low value token conceals the information related to the mobile payment source; and processing the transaction using the resources of the mobile payment source.

In accordance with another embodiment, a non-transitory machine-readable medium stores instructions that, when executed by an indicia-based payment transactions computing system, causes the indicia-based payment transactions computing system to perform a method for performing payment transactions using indicia-based associations between two or more user interfaces. The method includes: receiving transaction information related to a user's selection of goods or services from a merchant, including a transaction amount; generating or receiving an indicia encoding the transaction information related to the selected order, merchant, and payment amount; transmitting the indicia to be displayed, on a merchant site hosted by the merchant, the display of the indicia enabling a user interface of a user device to scan the indicia and extract information related to the selected order, merchant, and payment amount; receiving from a user device of a user, an authorization to process the payment transaction, based on the information related to the selected order, merchant, and payment amount, using a mobile payment source of the user; and if sufficient resources exist in the mobile payment source of the user for the payment transaction: generating and transmitting a low value token to the merchant indicating the authorization of the payment transaction using the mobile payment source of the user, wherein the low value token conceals the information related to the mobile payment source; and processing the transaction using the resources of the mobile payment source.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

DETAILED DESCRIPTION

Figure 1:
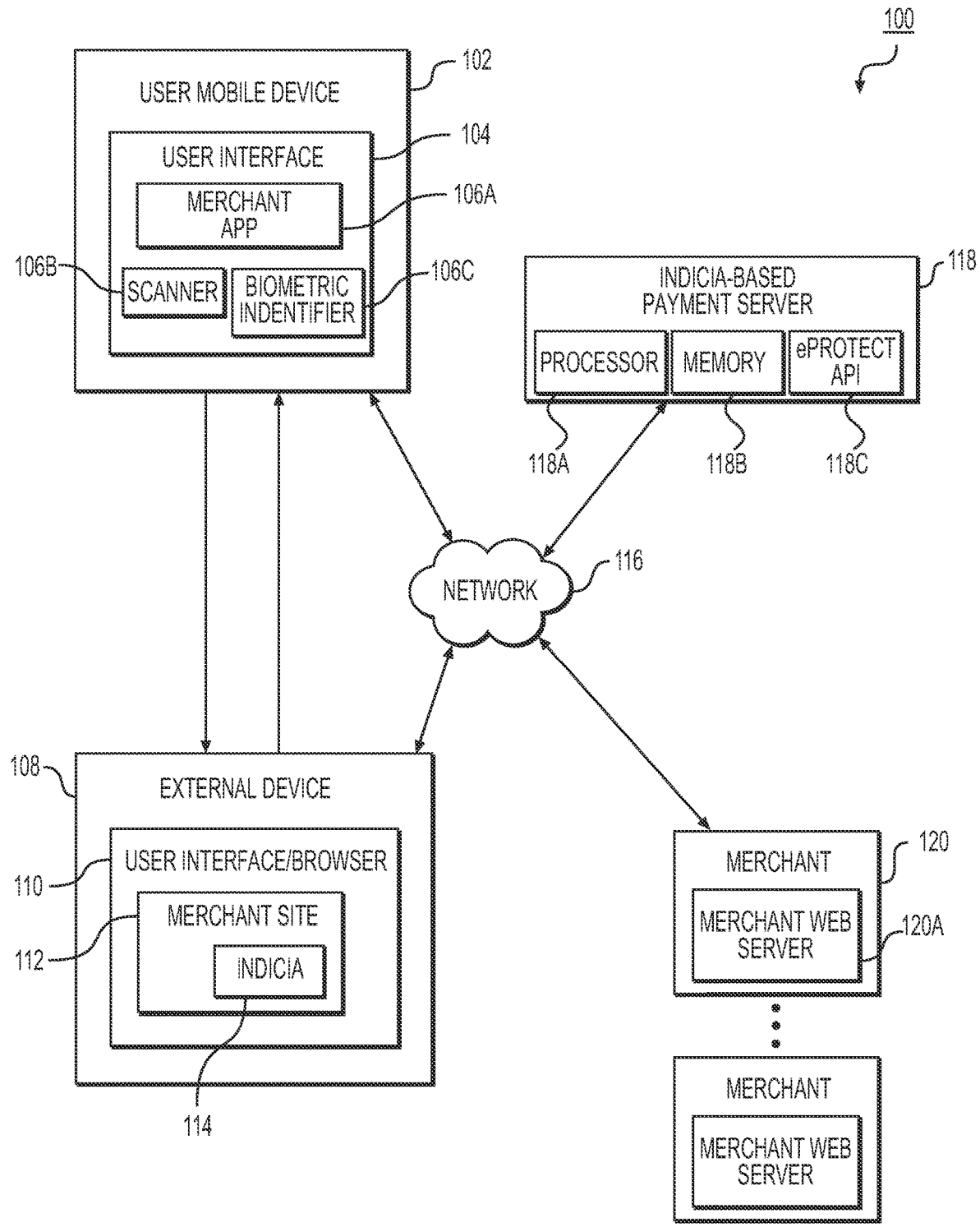
FIG. 1 depicts a block diagram of an example network of an indicia-based payment transaction environment, in accordance with a non-limiting embodiment of the indicia-based payment transaction system.

Various non-limiting embodiments of the present disclosure will now be described to provide an overall understanding of the principles of the structure, function, and use of systems and methods disclosed herein for indicia-based payment transactions using the association of two user interfaces.

As described above, consumers increasingly prefer to conduct payment transactions using mobile devices (e.g., smartphones) instead of through various physical cards that they may carry or store in a wallet. When using a mobile device to conduct a payment transaction, consumers may be hesitant have sensitive information related to their payment sources and/or their accounts (e.g., credit card numbers, checking account numbers, etc.) transferred to third parties, including merchants. In addition, consumers may desire to be able to conduct payment transactions at computers in the privacy of their homes, offices, etc., by simply using their handheld portable electronic devices, without having to travel to the location of a merchant payment terminal (e.g., a store), and without having to transfer any sensitive payment source and/or account information to the merchant.

Thus, the embodiments of the present disclosure are directed to a system and method that improves the experience of users in conducting payment transactions using mobile devices, by enabling users to conduct payment transactions anywhere is the user has access to a user interface that can access a merchant site, and by creating a system that ensures that sensitive and/or valuable user information (e.g., payment source and account details) are not shared with merchants or other third parties during the course of the payment transaction.

At a high level, at least some of the embodiments of the present disclosure disclose a system and method for performing an indicia-based payment transaction using the association of two interfaces. For example, a user, in the comfort of his or her home or office, may visit a merchant site, and check out with an online "shopping cart" comprising a good or service to be purchased. The merchant site may list several options for payment, including an option to pay using the presently disclosed indicia-based payment system. Selecting the indicia-based payment option may lead the merchant site to retrieve indicia (e.g., a QR code) to be displayed on the merchant site, and the indicia may encode various information related to the proposed payment transaction, including, for example, the selected order details, merchant details, payment preferences, payment summary details, etc. The encryption into an indicia may prevent the merchant from accessing the user's secure or valuable information (e.g., payment source and/or account information). The user may use a mobile device (e.g., a smartphone) to scan the indicia that is being displayed on the merchant site. Upon scanning the indicia, the user mobile device may subsequently or concurrently open a mobile app displaying the proposed payment transaction, including various transaction-related information encoded in the indicia, and a proposed payment source (e.g., Visa, Master Card, American Express, etc.) to be used to fund the transaction. On the opened app, the user may approve or authorize the proposed payment transaction by authentication using a biometric identifier (e.g., fingerprint recognition). Thereafter, the user mobile device may transmit a signal to a computing system that manages the indicia-based payment transactions ("indicia-based payment server") to carry on the processing of the proposed payment transaction using the designated payment source. In order to safeguard valuable user information (e.g., a user's payment source and/or account details), the indicia-based payment source may encrypt any of the valuable user information when informing the merchant of the authorization of the payment transaction.

One or more examples of these non-limiting embodiments are illustrated in the selected examples disclosed and described in detail with reference made to FIGS. 1-4 and 5A-5D in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

FIG. 1 depicts a block diagram of an exemplary environment 100 of the indicia-based payment transaction system that uses the association of two interfaces ("indicia-based payment transaction system" or "environment"), in accordance with a non-limiting embodiment of the indicia-based payment transaction system. Specifically, environment 100 includes a user mobile device 102 having a user interface 104 that can scan an indicia 114 and display a merchant app 106, an external user device 108 having a user interface and/or browser 110 that can display a merchant site 112 and an indicia 114, indicia-based payment transactions computing system ("indicia-based payment server") 118 to manage the indicia-based payment transaction, and a plurality of merchant web servers 120 that host and/or update merchant sites 112. In addition, environment 100 may include a network 116 that may facilitate the communications between the various components of the environment, e.g., user mobile device 102, indicia-based payment server 118, merchant web servers 120, and the external user device 108.

Still referring to FIG. 1, the user mobile device 102 may be a handheld mobile device, (e.g., iPad, smartphone, personal digital assistant, a telephony device, etc.), a portable computer (e.g., lap top, handheld computer, notebook, etc.), and/or a wearable computer (e.g., watch) having a user interface 104 with the ability to scan and/or tap an indicia 114 that is displayed on a user interface 110 of an external user device 108. The scan and/or tap of an indicia may cause the user mobile device to receive payment transaction information that may trigger the user interface 104 of the user mobile device 102 to open a merchant app 106.

Still referring to FIG. 1, the external user device 108 may be a user device that is different from the user mobile device 102. In some embodiments, the external user device 108 may be an electronic device having a user interface and/or browser 110 that may enable the user to view and interact with a merchant site 112. The user interface and/or browser 110 of the external user device 108 may receive content for the merchant site 112 from merchant web servers 120 via a network 116. Upon the initiation of a purchase transaction by a user, the merchant site 112 may display an indicia 114 on the user interface/browser 110. The content for the indicia 114 may be received from the indicia-based payment server 118 via a network 116. In some embodiments, the user mobile device 102 may be a device that is mobile (e.g., iPad, smartphone, personal digital assistant, a wearable, etc.) whereas the external user device may be a device that is not as mobile (e.g., desktop computer, a lap top or notebook computer designated to be used at home, office, etc.). Yet, in other embodiments, the user mobile device 102 and the external user device 108 may both be mobile devices.

Still referring to FIG. 1, environment 100 may further include the indicia-based payment server 118. The indicia-based payment server 118 may be embodied as any type of server or computing device capable of processing, communicating, storing, maintaining, and/or transferring data. For example, the indicia-based payment server 118 may be embodied as a server, a microcomputer, a minicomputer, a mainframe, a desktop computer, a laptop computer, a mobile computing device, a handheld computer, a smart phone, a tablet computer, a personal digital assistant, a telephony device, a custom chip, an embedded processing device, or other computing device and/or suitable programmable device.

Still referring to FIG. 1, the indicia-based payment server 118 may further include a processor 118A and a memory and/or storage device 118B. In some embodiments, the indicia-based payment server 118 may also have an application programming interface 118 C that may be configured to secure a user's payment source information from being available to third parties (e.g., merchants, external user devices, etc.). The application programming interface 118C may eliminate a user's payment source and/or personal data from the third parties and may reduce the threat of the distribution of a user's account data by transferring the burden of handling a user's payment source data to the indicia-based payments server. In some embodiments, the application programming interface 118C is able to conceal sensitive user information related to the user's account and/or payment sources by presenting only low value tokens to necessary third parties (e.g., merchants, external user devices, etc.). For purposes of disclosure, this application programming interface may be referred to as "eProtect API" 118C. The indicia-based payment server 118 may have an application or instructions for generating an indicia based on received payment transaction information. In some embodiments, this application or instruction ("indicia generator") may be stored in the memory 118B.

Still referring to FIG. 1, the processor 118A may be embodied as any type of processor capable of performing the functions described herein. For example, the processor 118A may be embodied as a single or multi-core processor, a digital signal processor, microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or other processor or processing/controlling circuit or controller.

Still referring to FIG. 1, the memory and/or electronic storage device ("memory") 118B of the indicia-based payment server 118 may keep track of one or more of received payment transaction information, generated indicia, merchant information, user mobile device information, user identification information, and user payment source information. In some embodiments, the indicia-based payment server may manage information (e.g., the payment transaction information, user payment source information, merchant information, etc.) using a database within memory 118B. In one embodiment, information related to processing of a payment transaction may be managed using a ledger or shared ledger that utilizes block chain technology. In some embodiments, the memory 118B, may store information related to each user of the indicia-based payment transaction system, and map various information related to each user together (e.g., user account information, user payment source information, user authentication information, etc.). For example, when a user creates an account to use the indicia-based payment transaction system, the indicia-based payment server may link information regarding the user's mobile device to the user account. In addition, as the user enters in information regarding the payment sources that a user may like to use during payment transactions (e.g., debit cards, credit cards, reward programs, etc.), the indicia-based payment server may automatically link the user payment source information to the user account. Even further, a user's authentication information (e.g., a user's fingerprint or biometric data) may also be linked to the user account. The above described user related information may be stored within memory 118B.

Still referring to FIG. 1, the memory 118B may be embodied as any type of volatile or non-volatile memory or data storage capable of performing the functions described herein. For example, one or more devices comprising the memory 118B may be embodied as read-only memory (ROM), random access memory (RAM), cache memory associated with processor 118A, or other memory devices such as dynamic RAM (DRAM), magnetic RAM (MRAM), static ram (SRAM), programmable ROM (PROM), electrically erasable PROM (EEPROM), flash memory, a removable memory card or disk, a solid state drive, and so forth. In operation, memory 118B may store various data and software used during operation of the indicia-based payment server 118, such as operating systems, applications, programs, libraries, and drivers.

Still referring to FIG. 1, the memory 118B may also be embodied as any type of device or devices configured for short-term or long-term storage of data such as, for example, memory devices and circuits, memory cards, hard disk drives, solid-state drives, or other data storage devices, such as magnetic disk drives, floppy drives, tape drives, hard drives, optical drives and media, magneto-optical drives and media, compact disc drives, Compact Disc Read Only Memory (CD-ROM), Compact Disc Recordable (CD-R), Compact Disc Rewriteable (CD-RW), a suitable type of Digital Versatile Disc (DVD) or Blu-Ray disc, and so forth, or flash drives, solid state hard drives, redundant array of individual disks (RAID), virtual drives, networked drives and other memory means including storage media on the processor 118A. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

Still referring to FIG. 1, in some embodiments, a communication circuitry within the indicia-based payment server 118 may enable communication with various components of environment 100, and the processor 118A may manage incoming and outgoing information from communication circuitry. The communication circuitry 124 may be embodied as one or more network interface controllers (NICs), using any one or more communication technologies (e.g., wireless or wired communications) and associated protocols (e.g., Ethernet, Wi-Fi®, WiMAX, etc.) to effect such communication. In some embodiments, the indicia-based payments server 118 may include a system bus for interconnecting the various components of the indicia-based payments server 118.

Still referring to FIG. 1, the environment 100 may further include a plurality of merchant web servers 120. Each merchant web server may host, develop, and/or update the merchant site 112 that may be accessed at the external user interface/browser 110. Each web server may belong to a merchant, with whom a user may initiate a payment transaction.

Figure 2:
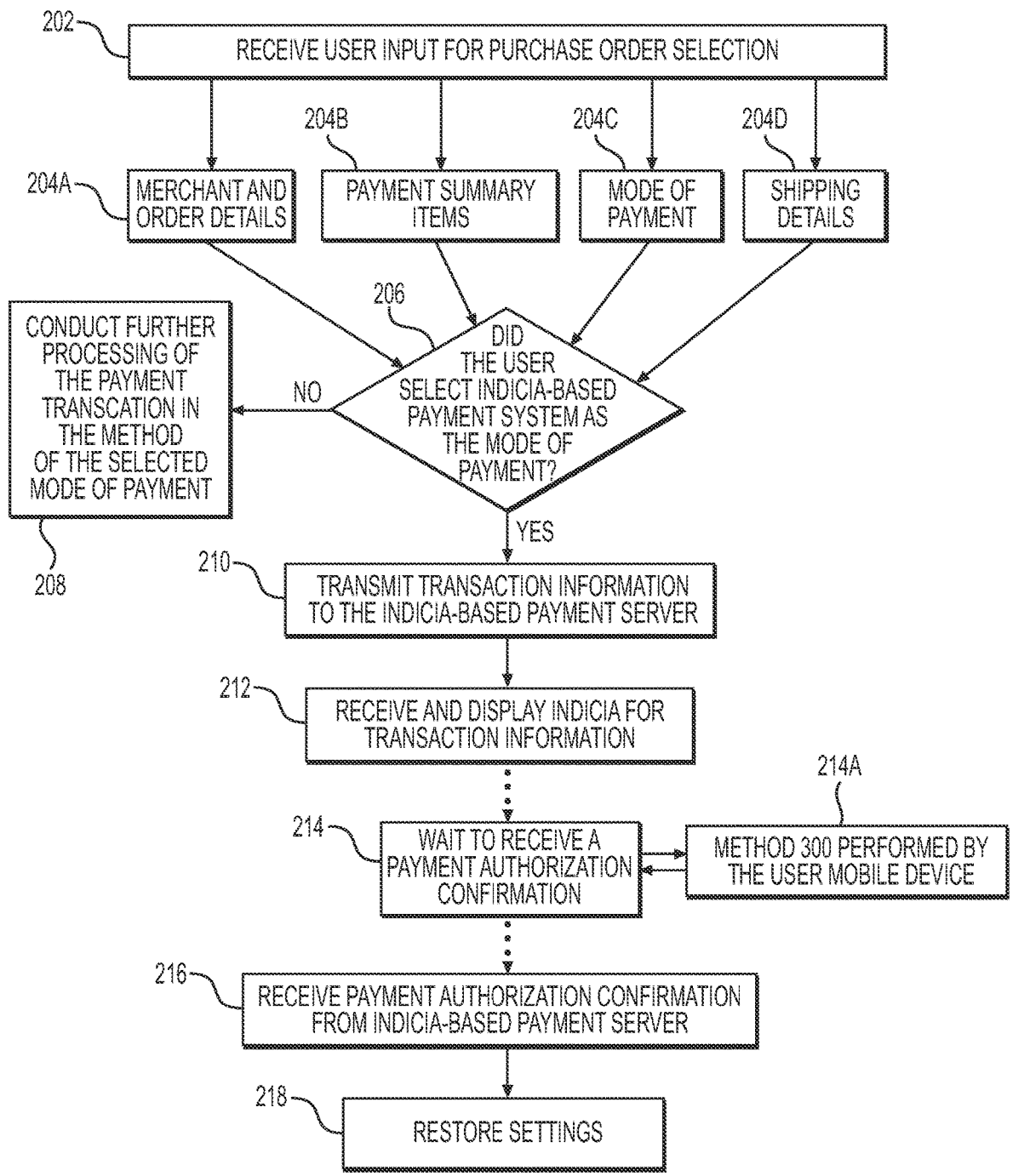
FIG. 2 is a flow chart depicting an example process executed by a merchant web server, in accordance with a non-limiting embodiment of the indicia-based payment transaction system.

FIG. 2 is a flow chart depicting an example method 200 executed by the merchant web server of a merchant, in accordance with a non-limiting embodiment of the indicia-based payment transaction system. In some embodiments, the merchant web server may receive various user input from and/or display various results of method 200 (e.g., indicia, payment authorization confirmation, etc.) on a merchant site hosted by the merchant web server. The merchant site may be accessible via a user interface on an external user device (e.g., as in 110 in FIG. 1). While it may or may not be shown in figures, it is assumed that communications between indicia-based payments server and one or more of the merchant web server, external user device, and/or user mobile device, may occur via a network. While FIG. 2 depicts various aspects of a payment transaction process involving one merchant and one user for purposes of disclosure, it is contemplated that any number of merchants may be involved in the methods discussed.

Step 202 may include receiving a user input for a purchase order selection. The user input may include, one or more merchant and order details 204A, payment summary details 204B, a mode of payment 204C, and shipping details 204D. (e.g., if there is a good being ordered). The merchant and order details may include, but are not limited to, an identification of the merchant and/or merchant group (merchant ID) from which a good or service is being ordered, an identification of the ordered good or service (e.g., order number and/or order reference number), the quantity of each ordered good or service, the type and/or subcategory of the good and/or services ordered, the date and/or time of purchase, etc. The payment summary details may include, one or more of, the cost of each ordered good and/or service, the cumulative cost of the ordered goods and/or services, service fees, gratuity fees, taxes, conversion fees, a total cost, a selection of a currency to be used for the transaction, etc. The payment summary details may include adding together the costs of the individual items (e.g., goods and/or services) being purchased, shipping fees, and any gratuities, taxes, service fees, conversion fees, etc. Furthermore, the payment summary details may also include an itemization of how the payment of the final cost by the user is to be apportioned (e.g., how much of the payment would go to tax, to the merchant, to a third-party, etc.). In some embodiments, the calculation of various costs or fees in the payment summary detail may be performed by the merchant web server. The mode of payment 204C may be a selection by the user on the desired way to pay for the proposed payment transaction. The choices for the mode of payment may include conventional ways of payment on online merchant sites (e.g., visa debit, credit card, checking, etc.). In addition, one mode of payment may include paying using the indicia-based payment system as described in the present disclosure. The shipping details may include, one or more of, the method of delivery, the date and time of arrival and/or shipment, shipping related fees, etc.

Step 206 may include determining whether the user has selected the indicia-based payment system as the mode of payment for the proposed payment transaction. If, subsequent to step 206, the merchant web server determines that the user has selected the indicia-based payment system as the mode of payment, step 210 may include transmitting the received user input ("transaction-related information" or "transaction information") to the indicia-based payment server. Thus, the transaction information may include the merchant and order details, payment summary details, and/or shipping details. As the amount of information allowed inside an indicia may vary, the indicia server may hold that data and provide the indicia with just a hash string. When the user device scans the indicia, the user device may call the indicia-based payment server to retrieve the information associated with that indicia (e.g., amount, taxes, shipping and handling, etc.), or the user device and/or indicia-based payment server may find the information contained within the indicia itself. At step 210, the transaction-related information may be received by the indicia-based payments server, and be encrypted into an indicia that may be transmitted back to the merchant web server in step 212. In some embodiments, before the transaction-related information is encrypted into an indicia to be transmitted back to the merchant web server, the indicia-based payment server may add a user's payment source and/or account details to the transaction-related information. The payment source and/or account details may include, for example, an identification user's pre-configured and/or designated payment source to be used for payment transactions, an account number or identifier to avail the payment source (e.g., payment card number, bank identification number, primary account number, issuer identification number, rewards program number etc.). The encryption of the user's payment source and/or account details into an indicia, along with the transaction-related information, aids in securing valuable information of the user and preventing the sharing of the information to third parties (e.g., merchants).

If, subsequent to step 206, the merchant web server determines that the user has not selected the indicia-based payment system as the mode of payment, step 208 may include conducting further processing of the payment transaction in the method of the selected mode of payment. For example, if the user has selected to pay using a visa debit card, the merchant site may then ask the user for the user's visa debit card details.

Step 212 may include receiving and displaying an indicia for the transaction information. The indicia may be generated by the indicia-based payment server and may encode the transaction information in a form that can be scanned by the user mobile device. In some embodiments, the indicia may be one or more of a one-dimensional bar code, a two-dimensional bar code (e.g., a QR code), or code that facilitates the relaying of transaction information to a mobile device using a scanning or image capturing modality (e.g., scanner, camera, etc.) of the user mobile device.

Step 214, the merchant web server may wait to receive a payment authorization confirmation. At step 214, method 300, as described in FIG. 3, may be performed by the user mobile device (e.g., indicated as 214A in FIG. 2).

Step 216 may include receiving a payment authorization confirmation from the indicia-based payment server. The payment authorization confirmation indicates to the merchant that the user has authorized the payment transaction to be processed and/or that the user has the requisite resources in a selected payment source for the payment transaction to be processed. The requisite resources may be satisfied, for example, by having a sufficient balance of funds in a payment source (or card representing a payment source) to pay for the payment transaction. In order to safeguard a user's valuable payment source and/or account information, the indicia-based payment server may encrypt information related to the user's payment source and/or account. For example a low value token of such information may be presented to the merchant web server. In some embodiments, for example, where a user has decided to not authorize a payment transaction or does not have sufficient resources to fund the payment transaction, the merchant web server may receive a payment authorization denial from the indicia-based payment server, indicating that the proposed payment transaction cannot be processed.

Step 218 may include restoring the settings of the merchant site hosted by the merchant web server so as to enable a new payment transaction. For example, the merchant web server may update its merchant site to indicate, for example, that the transaction is now complete. In some embodiments, the merchant site may have a button or functionality to begin a new transaction, for example, by returning to a default page via an exit button.

In some embodiments, one or more of the merchant web server 120A, external device 108, user mobile device 102, and/or indicia-based payment server 118 may be programmed to wait asynchronously (e.g., during step 214), as will be explained below.

For example, subsequent to step 212, a user may scan or capture the indicia displayed on the external device, using a user device (e.g., as in step 302 as will be described in method 300), and then may (eventually) request to authorize the transaction (e.g., as in step 310 as will be described in method 300). The user device may (eventually) send a request to authorize transaction to indicia-based payment server (e.g., as in step 314 as will be described in method 300), along with an account number or identifier to avail the payment source of the user (e.g., payment card number, bank identification number, primary account number, issuer identification number, rewards program number etc.). The indicia-based payment server may convert the account number or identifier into a low value token. The low value token may be sent to the user interface/browser 110 on external device 108, and may trigger the user interface/browser to submit the LVT to merchant web server 120A. This may allow the merchant to implement an acceptance of the payment authorization without having to update their back end systems and/or without having to see sensitive information of the user (account number or identifier).

In such an embodiment, there may be various asynchronous behaviors. One asynchronous behavior may be when the user interface/browser 110 on the external user device 108 is waiting to receive the low value token from the indicia-based payment server 108 (e.g., as in step 214 but with a low value token). Once received, the user interface/browser 110 on the external device 108 may be triggered to send the low value token to a merchant web server 120A of the merchant 120 of the instant transaction. This may be done with "webworkers", a capability available on web browsers, known to persons having ordinary skill in the art. Alternatively or additionally, the user interface/browser 110 on the external device 108 may poll the indicia-based payment server 118 in intervals of time (e.g., half second) looking for a low value token (LVT) associated with the indicia. Once the low value token (LVT) is found, the user interface/browser 110 on the external device 108, and/or the indicia-based payment server 118, may submit the low value token (LVT) to the merchant web server 120A, e.g., via JavaScript.

A second asynchronous behavior may be to update the user mobile device 102 so that it may inform the user that a user's input on the user mobile device 102 (e.g., authenticating a user request, authorizing the transaction, etc.) is complete and/or that the user may now return his or her attention to the external device 108 to continue the transaction. That could be accomplished by a push notification to the user mobile device 102, e.g., like existing push notifications that are sent to apps on a mobile phone. Alternatively or additionally, the user mobile device 102 may poll the indicia-based payment server 108 in intervals of time (e.g., every half second) looking for a status change that would indicate that the user mobile device should inform the user, as previously described. In some embodiments when the merchant web server 120A calls the payment processor to perform the authorization, the indicia-based payment server 118 may be updated to indicate that the authorization was approved. Further status updates may also be sent to the user mobile device 102 to inform the user, e.g., when shipping occurred, when shipment has been delivered, etc.

Figure 3:
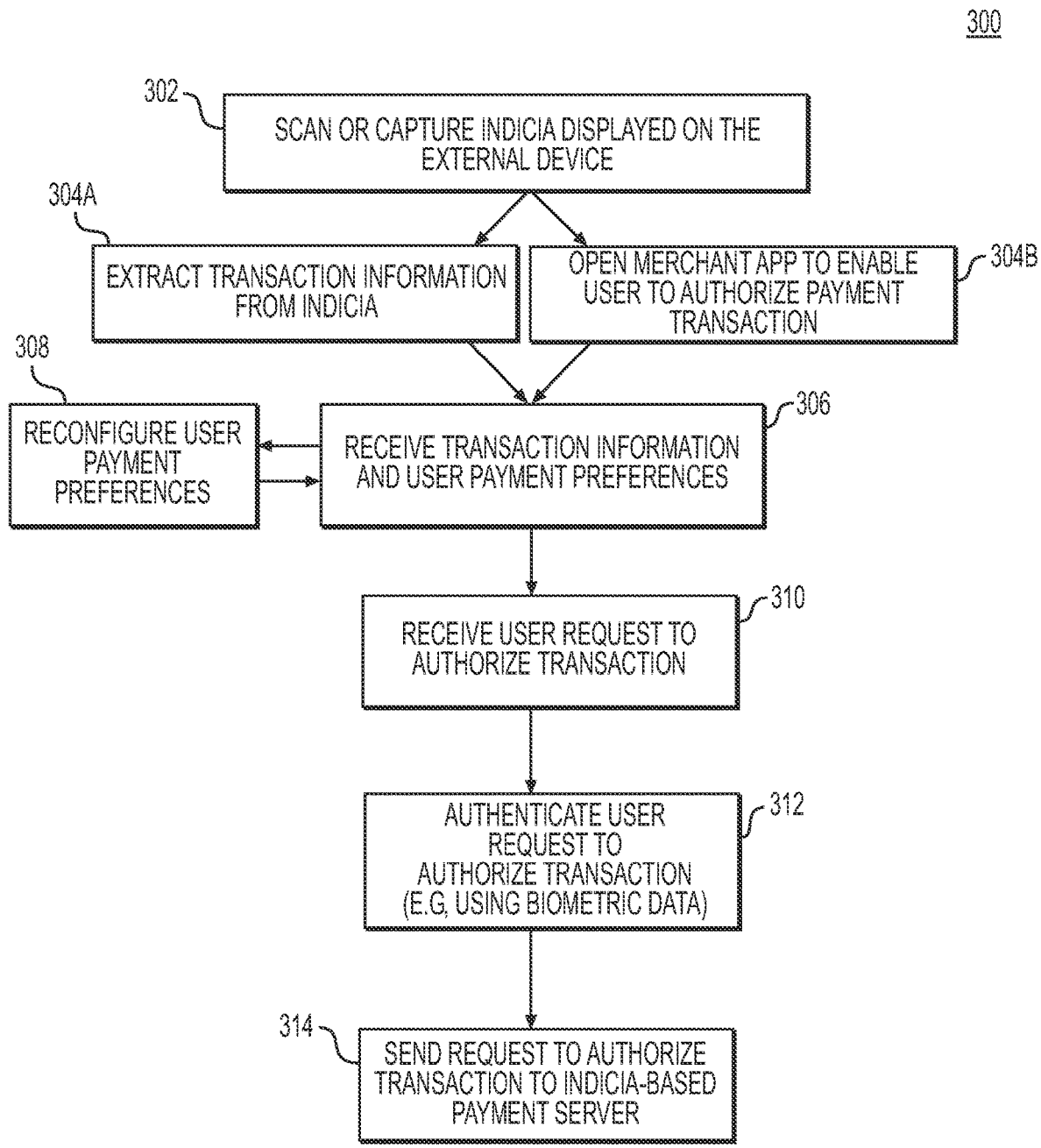
FIG. 3 is a flow chart depicting an example process executed by the user mobile device having a user interface, in accordance with a non-limiting embodiment of the indicia-based payment transaction system.

FIG. 3 is a flow chart depicting an example process executed by the user mobile device having a user interface, in accordance with a non-limiting embodiment of the indicia-based payment transaction system.

Step 302 may include scanning or capturing the indicia displayed on the external device using the user mobile device. In some embodiments, the user mobile device may scan or capture the indicia using a scanning or capturing modality located on the user mobile device ("scanner"). The indicia may encode and/or facilitate the transmission of various transaction-related information that was sent by the merchant web server to the indicia-based payment server. In some embodiments, for example, where the indicia-based payment server has also added the user's payment source and/or account details to the transaction-related information, the indicia may also encrypt the user's payment source and/or account information. The user mobile device may access the transaction information via a mobile app that may display the transaction information, as encoded or transmitted by the indicia. In some embodiments the user mobile device may need to call the indicia server to fetch the transaction-related information.

Thus, step 304A may include extracting the transaction information from the indicia and step 304B may include opening a mobile app that enables the user to authorize the payment transaction. In some embodiments, the scanning of the indicia itself may trigger the opening of the mobile app on the user mobile device through information encoded on the indicia. Thus, in some embodiments, steps 304A and 304B may be performed concurrently.

In some embodiments, for example, where the indicia-based payment server does not add a user's payment source and/or account information to the transaction-related information, it may be the user who selects a payment source and/or account information to be used for processing the payment transaction. In such embodiments, step 306 may include receiving payment source and user payment preferences from the user. Furthermore, various payment sources and/or account information may be saved to the user mobile device and/or mobile app, and the user may simply select the desired payment source and/or account to be used to process the transaction. In other embodiments, for example, where the indicia-based payment server stores the user's payment sources and/or account details and encrypts them into the indicia, the mobile app may display the payment source and/or account that is to be used to process the payment transaction. In some embodiments, a user may choose to reconfigure the payment source and/or account to be used to pay for the payment transaction (e.g., as in step 308), and the mobile app may enable a user to do so. In some embodiments, the payment preferences may be configured prior to, or during the payment transaction process. For example, a user of the indicia-based payment transaction may configure payment preferences during the time the user signs up and/or creates an account for the indicia-based payment transaction system.

Step 310 may include receiving a user request to authorize transaction. Additionally, or alternatively, step 312 may include authenticating the user request to authorize the transaction. For example, after a merchant app has opened up on the user interface of the user mobile device, displaying the payment transaction detail and the user's payment preferences, a user may select to authorize the transaction (e.g., via a button). Immediately after, the user may be asked to tap or press an area of the screen for the user interface to track the user's fingerprint in order to authenticate the user. It is envisioned that other forms of biometric data may be used besides a fingerprint. Other forms of biometric data may include, but are not limited to a voice input for voice recognition, or an eye scan for eye pattern recognition. In some embodiments, authentication may be performed by prompting the user to enter a passcode, for example. Subsequent to the authentication, step 314 may include sending the authorization of the transaction to the indicia-based payment server via a network.

Figure 4:
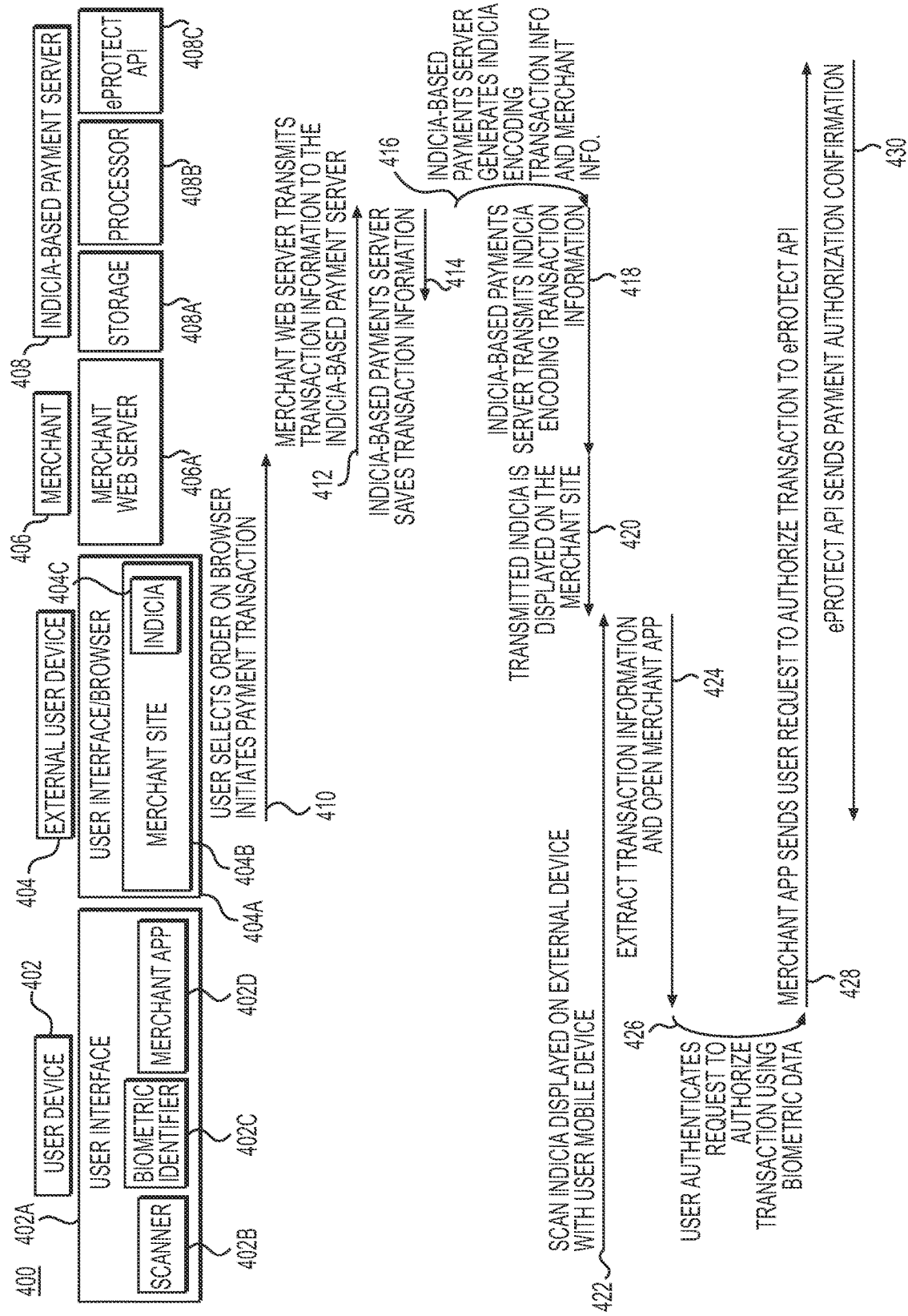
FIG. 4. depicts a simplified sequence flow diagram of the indicia-based payment transaction system, in accordance with a non-limiting embodiment of the indicia-based payment transaction system

FIG. 4. depicts a simplified sequence flow diagram of method 400 in the indicia-based payment transaction system, in accordance with a non-limiting embodiment of the indicia-based payment transaction system. Method 400 may be executed by the devices and/or components related to the user mobile device 402 (e.g., a user interface 402A, which may comprise a scanning or indicia-capturing modality ("scanner") 402B, a biometric identifier 402C, and a merchant app 402D), the external user device 404 (e.g., the user interface/browser 404A that may display the merchant site 404B, and the merchant site may display a received indicia 404C), the merchant 406 (e.g., merchant web server 406A), and the indicia-based payment server 408 (e.g., memory 408A, processor 408B, eProtect API 408C)

At process flow 410, a user may select a purchase order using the user interface/browser provided by the external user device, to initiate a payment transaction. The user's selection may be relayed to the merchant web server 406A. A user may use the user interface/browser of the external user device to access a merchant site 404B that is being controlled and hosted by the merchant web server 406A. Therefore, in some embodiments, a user input into the merchant site, using the user interface/browser may lead to a transmission of the input to the merchant web server. In some embodiments, a selection of a purchase order may include the selection of a quantity of a good or service from an identified merchant being, the good or service being offered for a transaction amount. Thus, the selection may result in a transmission of a transaction information, which may include, but is not limited to, merchant and order details, payment summary details, and shipping details (e.g., if there is a good being ordered). The merchant and order details may include, one or more of, an identification of a merchant and/or merchant group, (merchant ID), an identification of the ordered good or service (e.g., order number and/or order reference number), the quantity of each ordered good or service, the type and/or subcategory of the good and/or services ordered, the date and/or time of purchase, etc. The payment summary details may include, one or more of, the cost of each ordered good and/or service, the cumulative cost of the ordered goods and/or services, service fees, gratuity fees, taxes, conversion fees, a total cost, a selection of a currency and/or mode of payment to be used for the transaction, etc. The shipping details may include, one or more of, the method of delivery, the date and time of arrival and/or shipment, shipping related fees, etc.

At process flow 412, the merchant web server may transmit the above described transaction information to the indicia-based payment server. The transmission may occur over a network. The transaction may be received by a communication circuitry of the indicia-based payment server and/or may be processed at the processor 408B.

At process flow 414, the indicia-based payments server may save the transaction information into the memory 408A. However, in other embodiments, the transaction information need not be saved in the memory at this stage of the process. In some embodiments, the indicia-based payments server may look up information regarding the user and/or user account of the indicia-based payment system using some of the transaction information. For example, if the memory of the indicia-based payment systems stores information related to the payment source and/or payment preferences of a user, then the indicia-base payment server may look up what amount is to be withdrawn from the payment source(s) of the user based on the payment summary information. In such embodiments, information gained from looking up a user's stored account may further be added to the transaction information.

At process flow 416, the indicia-based payments server may generate an indicia that encodes the transaction information. The indicia may be one or more of a one-dimensional bar code, a two-dimensional bar code (e.g., a QR code), or any machine readable design that may facilitate the relaying of transaction information to a mobile device using a scanner of the user mobile device. Thus, the indicia may encode one or more of the merchant and order details, payment summary details, and/or shipping details. In some embodiments, where a user of the indicia-based payment system initially signs up and stores payment source information and payment preferences into the memory of the indicia-based payment system, the indicia may also include information related to the user's payment source(s), the user's payment preferences, and the user's amounts to be deducted from a user's payment source(s). In some embodiments, the initiated indicia may be saved to the memory, at least temporarily.

At process flow 418, the indicia-based payments server may transmit the indicia encoding the transaction information to the merchant web server. As the merchant web server hosts and controls the merchant site, a user may be able to view the indicia on the merchant site, using the user interface/browser of the external user device. Thus, at process flow 420, the transmitted indicia may be displayed on the merchant site enabling a user to view the indicia using the user interface/browser of the external user device 404.

At process flow 422, the user mobile device 402 may scan and/or capture the indicia displayed on the external user device using, for example the scanner 402B of the user mobile device 402. In some embodiments, the scanner may utilize near field communication and/or radiofrequency identification technology.

At process flow 424, the user mobile device 402 may extract the transaction information, as encoded in the indicia, and open a merchant app in the user mobile device. In some embodiments, the scanning of the indicia may automatically open the merchant app. In some embodiments, a merchant app may be unique for each merchant. In such embodiments, the transaction information may include information about a merchant that would cause the user mobile device to open up the merchant app that pertains to the merchant of the transaction. In other embodiments, the merchant app may be independent of the actual merchant of a transaction, and may simply be a general indicia-based payment transactions app that a plurality of merchants have subscribed to in order to facilitate indicia-based payment transactions. As the merchant app opens, the transaction information extracted from the indicia may be displayed and/or be used to populate data fields in the merchant app. For example, the opened merchant app in the user mobile may display one or more of the ordered goods and/or services, a total cost, an itemization of the cost (including taxes, service fees, gratuities, conversion fees delivery related fees, etc.), shipment information, and an option for a user to authorize the payment transaction and/or be authenticate to authorize the payment transaction. In some embodiments, the opened merchant app may also show a designated payment source and/or payment preference to be utilized to pay for the cost of the payment transaction, and may also allow the user with an option to reconfigure payment preference settings (e.g., switch to a different payment source or select a different payment preference setting).

At process flow 426, the user of the user mobile device may authenticate the request and/or confirmation to authorize the payment transaction, using for example a biometric identifier 402C. In some embodiments, the authentication may be performed via fingerprint matching of the user. For example, upon selecting the option to authenticate a request to authorize transaction, by a user, the merchant app may lead to an interface that prompts the user to press the screen for a biometric identification modality to capture the fingerprint of the user. The captured fingerprint may then be compared to a saved fingerprint of the user to verify that it is indeed the user who is requesting the authorization of the payment transaction. In other embodiments, other forms of authentication may be used, including but not limited to, voice recognition, passcodes, eye pattern recognition, etc.

At process flow 428, the merchant app 402D may send the authenticated user request to authorize the transaction to the indicia-based payment server, in order to securely process the transaction, using, for example, the eProtect API. As explained above, the eProtect API that may be an application program interface that secures a user's payment source and/or account information from being available to third parties (e.g., merchants, external user devices, etc.). By eliminating a user's payment source and/or personal data from the third parties, the eProtect API may reduce the threat of the distribution of a user's account data by transferring the burden of handling a user's payment source data to the indicia-based payments server. In some embodiments, the application programming interface 118C is able to conceal sensitive user information related to the user's account and/or payment sources by presenting only low value tokens to necessary third parties (e.g., merchants, external user devices, etc.). Therefore, since the user request to authorize transaction is being directed to the indicia-based payment server, the request may include information related to the user's payment source(s) and payment preference settings. In some embodiments, the request may further relay the transaction information back to the indicia-based payments server if, for example, the transaction information had not been stored at process flow 414.

At process flow 430, the eProtect API may send a payment authorization confirmation to the merchant web server. In some embodiment, the payment authorization confirmation may include a low value token that signifies the user of the, user account, and/or payment source used in the payment transaction authorization. Thereafter, the payment transaction may be processed and/or be accounted for processing. In some embodiments, the indicia-based payment server may function as a merchant acquirer and conduct the payment transaction processing.

Figure 5A:
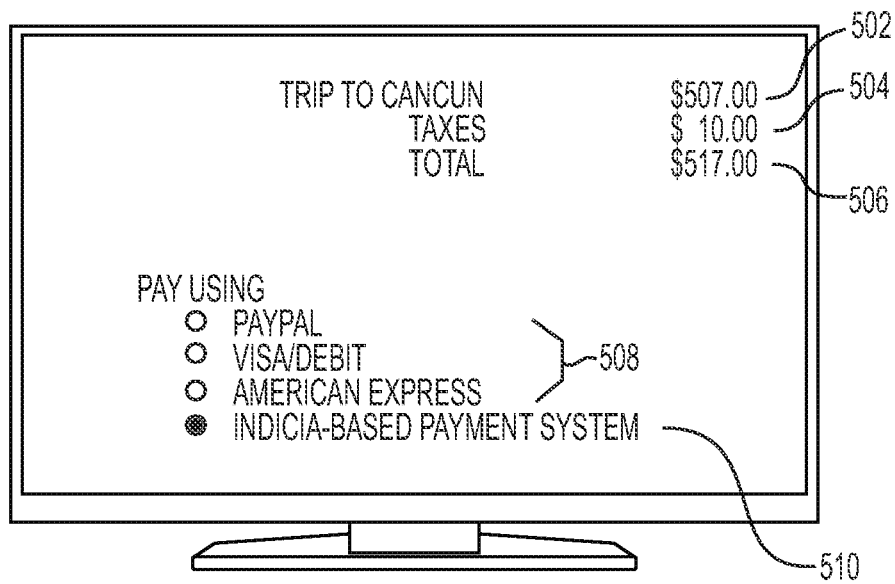
FIG. 5A depicts an exemplary screenshot of an external user interface of the indicia-based payment transaction system, in accordance with a non-limiting embodiment of the indicia-based payment transaction system.

FIG. 5A depicts an exemplary screenshot of the user interface/browser of the external user device of the indicia-based payment transaction system, in accordance with a non-limiting embodiment of the indicia-based payment transaction system. The screenshot may be of the user interface/browser after a user has selected an order (e.g., a trip to Cancun), and is about to select a payment preference. Thus, FIG. 5A may be an exemplary screenshot before the transaction information has been finalized to be transmitted to the indicia-based payment server, via the merchant web server. The order selected, "Trip to Cancun" appears to have a cost 502 of $507.00, along with taxes 504 of $10.00, resulting in a total cost 506 of $517.00. A user may select various payment options for the order. While traditional modes of online payment transaction 508 may result in user account and/or payment source information becoming available to the merchant, the indicia-based payment system 510 may enable the user to initiate a payment transaction that prevents third parties (e.g., merchants, external user devices, etc.) from having a user's payment source and/or account information.

Figure 5B:
FIG. 5B depicts an illustration of a user, the user interface of the user's user mobile device, and the external user interface, in accordance with a non-limiting embodiment of the indicia-based payment transaction system.

FIG. 5B depicts an illustration of a user, the user interface of the user's user mobile device, and the external user interface, in accordance with a non-limiting embodiment of the indicia-based payment transaction system. After a user has selected an order for a good or service from a merchant site on the external user interface 514, the merchant web server may transmit information related to the user's selected order, merchant, delivery, and payment preferences ("transaction information") to the indicia-based payments server. In return, the indicia-based payments server may generate and transmit an indicia encoding the transaction information to the merchant web server. In some embodiments, the indicia-based payment server may add further details to the transaction-related information, for example, a user's payment source information, and generate an indicia that encodes that the augmented transaction-related information. As shown in FIG. 5B, the external user interface 514 is being used to view the merchant site, on which the indicia is not displayed. By encrypting the transaction-related information into an indicia 514, the indicia-based payment system protects any valuable details about the user (e.g., payment source information) from third parties (e.g., merchant, external user device). A user may use his or her user mobile device 512 to scan or capture the indicia displayed on the external user device, and thereby extract the transaction-related information into the user mobile device 512 of the user. The scanning or capturing of the indicia may be performed by a scanner in the user device 512.

Figure 5C:
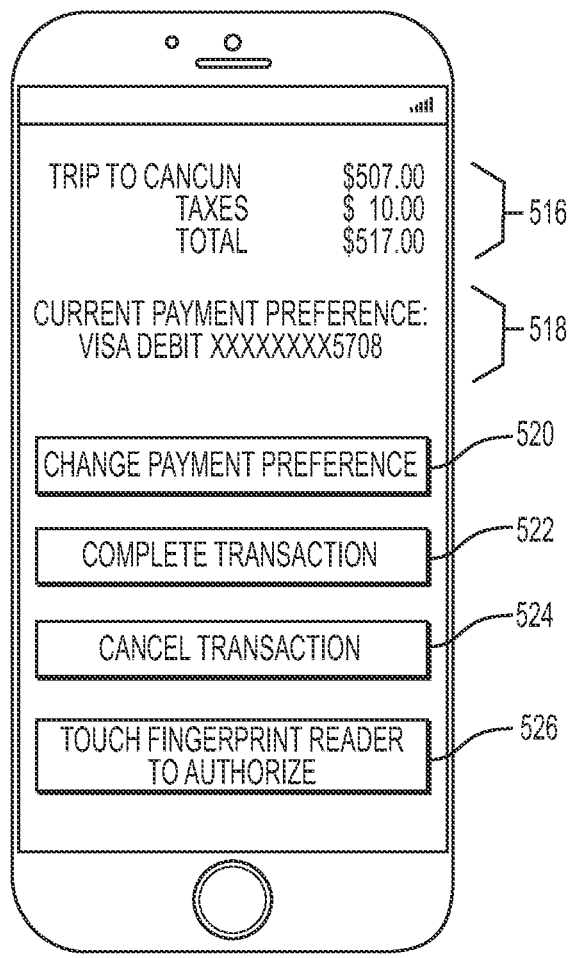
FIG. 5C depicts an exemplary screenshot of the user interface of the user mobile device of the indicia-based payment transaction system, in accordance with a non-limiting embodiment of the indicia-based payment transaction system.

FIG. 5C depicts an exemplary screenshot of the user interface of the user mobile device of the indicia-based payment transaction system, in accordance with a non-limiting embodiment of the indicia-based payment transaction system. Once a user mobile device has scanned or captured the indicia displayed on user interface of the external device (e.g., as illustrated in FIG. 5B), the user mobile device may extract the transaction-related information. Subsequently or concurrently, the user device may open a mobile app with the transaction-related information stored and/or displayed within the mobile app. As shown in FIG. 5C, the app may display the ordered good or service (e.g., "Trip to Cancun") and payment summary details 515. In addition, the app may display a payment source and/or payment preference 518 of the user (e.g., "Current Payment Preference: Visa Debit . . . 5708"). In some embodiments, a user may have the option to change the payment preference of the user (e.g., "Change Payment Preference" 520) using the user mobile device. In addition, a user may have the option, at this stage of the payment transaction process, to cancel the transaction (e.g., cancel transaction" 522) using the user mobile device. Once a user approves the transaction-related information, as displayed on the user interface of the user mobile device, a user may authorize the payment transaction by authenticating (e.g., "Touch fingerprint reader to authorize" 524A). In some embodiments, the authentication may include a user input of a biometric data (e.g., a finger print via a fingerprint reader 524B, a voice input via a voice recognition app, an eye scan via an eye reader, etc.), and/or a passcode entry. In other embodiments, a user may authorize a payment transaction without having to authenticate.

Figure 5D:
FIG. 5D depicts an exemplary screenshot of an external user interface of the indicia-based payment transaction system, in accordance with a non-limiting embodiment of the indicia-based payment transaction system.

FIG. 5D depicts an exemplary screenshot of an external user interface of the indicia-based payment transaction system, in accordance with a non-limiting embodiment of the indicia-based payment transaction system. Upon authorization of a payment transaction based on a received transaction-related information displayed on a mobile app (e.g., as illustrated in FIG. 5C), the indicia-based payment server may process the transaction, and notify the merchant of the authorization of the transaction. In some embodiments, the indicia-based payment server may encrypt any valuable user information (e.g., a user's payment source, payment preferences, and/or account information) into using, for example, the eProtect API, as described above. In such embodiments, the encrypted details (e.g., in the form of a low value token) may be sent to the merchant. Upon receiving notification from the indicia-based payment server that the payment transaction has been authorized and/or is being processed, the merchant (via its merchant web server) may update its merchant site to indicate, for example, that the transaction is now complete (e.g., "Your transaction is now complete . . . . Confirmation Code: AX5321" 526). In some embodiments, as shown in FIG. 5D, the merchant site may have a button or functionality to begin a new transaction, for example, by returning to a default page via 'exit'.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

It is intended that the specification and examples be considered as exemplary only, with a true scope and spirit of the invention being indicated by the following claims.

What is claimed is:

1. A computer-implemented method for performing an indicia-based payment transaction, the method comprising:
   receiving, from a merchant device of a merchant, transaction information related to a selection of goods or services from the merchant;
   generating or receiving an indicia encoded with the transaction information and encoded with additional information including payment preferences of a user;
   transmitting the indicia to be displayed at the merchant device of the merchant, the display of the indicia enabling a first user device to scan the indicia and extract information related to the transaction information;
   receiving, subsequent to tithe indicia being scanned by the first user device, and (ii) the indicia-based payment transaction being authorized on an application, of the first user device, that was opened in response to the indicia being scanned by the first user device, an authorization from the merchant device of the merchant to process the indicia-based payment transaction;
   generating and transmitting a token indicating the authorization of the indicia-based payment transaction to the merchant device of the merchant, wherein the token conceals information related to the indicia-based payment transaction; and
   processing the indicia-based payment transaction using the token.

2. The computer-implemented method of claim 1, further comprising, subsequent to transmitting the indicia to be displayed:
   enabling the scanning of a display of the indicia, by the first user device, to extract the information related to the payment preferences of the user; and
   enabling opening, by the user device, of a mobile application with information related to the payment preferences of the user.

3. The computer-implemented method of claim 2, wherein the indicia is displayed on a user interface of an external user device that is different from the first user device, and wherein the display of the indicia is scanned by the first user device.

4. The computer-implemented method of claim 2, further comprising:
   receiving a desired payment source to be used for the indicia-based payment transaction.

5. The computer-implemented method of claim 4, further comprising, subsequent to scanning a display of the indicia, by the first user device:
   displaying on a user interface of the first user device, information related to the desired payment source.

6. The computer-implemented method of claim 1, further comprising, prior to receiving the authorization to process the indicia-based payment transaction:
   authenticating the indicia-based payment transaction using biometric data.

7. The computer-implemented method of claim 1, wherein the indicia further encodes transaction information including one or more of:
   an identification of a merchant or merchant group;
   an identification of a good or service;
   a quantity of each good or service;
   a type or category that a good or service belongs to;
   a method of delivery for a good;
   a date and time of arrival or shipment for a good or service; and
   a date and/or time of a purchase.

8. The computer-implemented method of claim 1, wherein the indicia further encodes transaction information including one or more of:
   a cost of a good and/or service;
   a cumulative cost of goods and/or services;
   any one or more of service fees, gratuity fees, taxes, or conversion fees,
   a total cost reflecting the addition of any one or more of service fees, gratuity fees, taxes, conversion fees, or shipping related fees; and
   a selection of a currency and/or mode of payment to be used for the transaction.

9. The computer-implemented method of claim 1, wherein generating and transmitting a token indicating the authorization of the payment transaction is performed using an application programming interface.

10. The computer-implemented method of claim 1, further comprising:
    transmitting a signal that indicates that the payment transaction cannot be processed; and
    denying the further processing of the payment transaction.

11. A system for indicia-based payment transaction, the system comprising:
    a data storage device storing instructions for performing an indicia-based payment transaction;
    a server that hosts a site that is displayed on an external user interface;
    a first user device having a user interface; and
    a processor configured to execute the instructions to perform a method including:
      receiving, from a merchant device of a merchant, transaction information related to a selection of goods or services from the merchant;
      generating or receiving an indicia encoded with the transaction information and encoded with additional information including payment preferences of a user;
      transmitting the indicia to be displayed, the display of the indicia enabling the first user device to scan the indicia and extract information related to the transaction information;
      receiving, subsequent to (i) the indicia being scanned by the first user device, and (ii) the indicia-based payment transaction being authorized on an application, of the first user device, that was opened in response to the indicia being scanned by the first user device, an authorization from the merchant device of the merchant to process the indicia-based payment transaction;

generating and transmitting a token indicating the authorization of the indicia-based payment transaction to the merchant device of the merchant, wherein the token conceals information related to the indicia-based payment transaction; and processing the indicia-based payment transaction using the token.

12. The system of claim 11, further comprising:
receiving user input related to goods or services for a transaction amount;
transmitting information related to the goods or services;
receiving the indicia that encodes the information related to the transaction information; and
displaying the indicia.

13. The system of claim 11, wherein, subsequent to transmitting the indicia to be displayed, the first user device performs a method comprising:
scanning a display of the indicia, by the first user device, to extract the information related to the payment preferences of the user; and
opening, by the first user device, a mobile application with information related to the payment preferences of the user.

14. The system of claim 13, wherein the indicia is displayed on a user interface of an external user device that is different from the first user device, and wherein the display of the indicia is scanned by the first user device.

15. The system of claim 13, further comprising:
receiving a desired payment source to be used for the indicia-based payment transaction.

16. The system of claim 15, further comprising, subsequent to scanning the display of the indicia, by the first user device:
displaying on a user interface of the first user device, information related to the desired payment source.

17. The system of claim 11, wherein generating and transmitting a token indicating the authorization of the indicia-based payment transaction is performed using an application programming interface.

18. The system of claim 11, further comprising:
transmitting a signal that indicates that the indicia-based payment transaction cannot be processed; and
denying the further processing of the indicia-based payment transaction.

19. A non-transitory machine-readable medium storing instructions that, when executed by an indicia-based payment system, cause the indicia-based payment system to perform a method for performing an indicia-based payment transaction, the method including:
receiving, from a merchant device of a merchant, transaction information related to a selection of goods or services from the merchant;
generating or receiving an indicia encoded with the transaction information and encoded with additional information including payment preferences of a user;
transmitting the indicia to be displayed, the display of the indicia enabling a first user device to scan the indicia and extract information related to the transaction information;
receiving, subsequent to (i) the indicia being scanned by the first user device, and (ii) the indicia-based payment transaction being authorized on an application, of the first user device, that was opened in response to the indicia being scanned by the first user device, an authorization from the merchant device of the merchant to process the indicia-based payment transaction;
generating and transmitting a token indicating the authorization of the indicia-based payment transaction to the merchant device of the merchant, wherein the token conceals information related to the indicia-based payment transaction; and
processing the indicia-based payment transaction using the token.

20. The non-transitory machine-readable medium of claim 19, wherein, subsequent to transmitting the indicia to be displayed, the method further comprises:
enabling the scanning a display of the indicia, by the first user device, to extract the information related to the payment preferences of the user; and
enabling opening, by the first user device, of a mobile application with information related to the payment preferences of the user.

* * * * *

UNITED STATES PATENT AND TRADEMARK OFFICE
CERTIFICATE OF CORRECTION

PATENT NO. : 12,008,542 B2
APPLICATION NO. : 17/446137
DATED : June 11, 2024
INVENTOR(S) : David Tarbox It is certified that error appears in the above-identified patent and that said Letters Patent is hereby corrected as shown below:

In the Claims

In Column 17, Line 36, Claim 1, delete "tithe" and insert --(i) the--

Signed and Sealed this
Thirtieth Day of July, 2024

Katherine Kelly Vidal
*Director of the United States Patent and Trademark Office*